(12) United States Patent
Koide et al.

(10) Patent No.: US 9,567,919 B2
(45) Date of Patent: Feb. 14, 2017

(54) INDUSTRIAL VEHICLE

(71) Applicant: KABUSHIKI KAISHA TOYOTA JIDOSHOKKI, Kariya-shi, Aichi-ken (JP)

(72) Inventors: Yukikazu Koide, Aichi-ken (JP); Norihiko Kato, Aichi-ken (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 119 days.

(21) Appl. No.: 14/497,432

(22) Filed: Sep. 26, 2014

(65) Prior Publication Data
US 2015/0094936 A1    Apr. 2, 2015

(30) Foreign Application Priority Data

Sep. 27, 2013 (JP) .................. 2013-201770

(51) Int. Cl.
*F02D 28/00* (2006.01)
*B60W 10/06* (2006.01)
(Continued)

(52) U.S. Cl.
CPC ............. *F02D 28/00* (2013.01); *B60W 10/06* (2013.01); *B66F 9/07572* (2013.01); *B66F 9/20* (2013.01);
(Continued)

(58) Field of Classification Search
CPC ............... B60W 2300/121; B60W 2300/154; B60W 2300/17; B60W 10/06; B60W 2510/0638; B60W 2520/10; B60W 2540/10; B60W 2710/0666; B66F 9/07572; B66F 9/20; F02D 28/00; F02D 2250/26
(Continued)

(56) References Cited

U.S. PATENT DOCUMENTS

2008/0076623 A1* 3/2008 Tabata .................. B60K 6/445
477/5
2011/0308879 A1    12/2011 Shirao et al.
(Continued)

FOREIGN PATENT DOCUMENTS

EP    1666711 A1    6/2006
EP    2568148 A1    3/2013
(Continued)

OTHER PUBLICATIONS

Communication from European Patent Office dated Mar. 27, 2015 in Appln. No. 14186317.5-1752.
(Continued)

*Primary Examiner* — Khoi Tran
*Assistant Examiner* — Robert Nguyen
(74) *Attorney, Agent, or Firm* — Sughrue Mion, PLLC

(57) ABSTRACT

An industrial vehicle which is equipped with an engine and having an Eco-mode in which torque of the engine is restricted includes an accelerator, an accelerator opening detector that detects an opening of the accelerator, a vehicle speed detector that detects a speed of the vehicle, an engine speed detector that detects a speed of the engine, and a torque restriction releasing unit which, when the torque of the engine is restricted, if conditions that the opening of the accelerator detected by the accelerator opening detector is a first predetermined value or greater, that the vehicle speed detected by the vehicle speed detector is a second predetermined value or smaller and that the engine speed detected by the engine speed detector is a third predetermined value or smaller are satisfied, releases the torque restriction.

5 Claims, 2 Drawing Sheets

(51) Int. Cl.
*B66F 9/075* (2006.01)
*B66F 9/20* (2006.01)

(52) U.S. Cl.
CPC .. *B60W 2300/121* (2013.01); *B60W 2300/154* (2013.01); *B60W 2300/17* (2013.01); *B60W 2510/0638* (2013.01); *B60W 2520/10* (2013.01); *B60W 2540/10* (2013.01); *B60W 2710/0666* (2013.01); *F02D 2250/26* (2013.01)

(58) Field of Classification Search
USPC ........................................................ 701/110
See application file for complete search history.

(56) References Cited

U.S. PATENT DOCUMENTS

2012/0296533 A1    11/2012  Ota et al.
2013/0041561 A1*   2/2013   Asami ................... E02F 9/2246
                                                            701/50

FOREIGN PATENT DOCUMENTS

JP    2008-105532 A     5/2008
WO    2011/115290 A1    9/2011
WO    2012/086684 A1    6/2012

OTHER PUBLICATIONS

Communication dated Oct. 18, 2016 from the Japanese Patent Office in counterpart Application No. 2013-201770.

* cited by examiner

FIG. 2A TORQUE RESTRICTION RELEASING CONDITIONS

| CONDITION | REQUIREMENT |
| --- | --- |
| A1 | ACCELERATOR PEDAL OPENING ≥ XA |
| A2 | VEHICLE SPEED ≤ YA |
| A3 | ENGINE SPEED ≤ Z |
| A4 | NOT IN LOADING OPERATION |

FIG. 2B TORQUE RESTRICTION RESUMING CONDITIONS

| CONDITION | REQUIREMENT |
| --- | --- |
| B1 | ACCELERATOR PEDAL OPENING ≤ XB (< XA) |
| B2 | VEHICLE SPEED ≥ YB (> YA) → VEHICLE SPEED ≤ YA |

INDUSTRIAL VEHICLE

BACKGROUND OF THE INVENTION

The present invention relates to an engine-powered industrial vehicle.

A hybrid vehicle equipped with an Eco-mode (an economy mode) for the purpose of improving fuel efficiency has been proposed. By pressing the Eco-mode button, the vehicle is placed in the Eco-mode in which the output torque of the vehicle is restricted for energy saving, which leads to an efficient driving of an engine. Such vehicle is disclosed in Japanese Unexamined Patent Application Publication No. 2008-105532.

This Publication discloses a hybrid vehicle in which, in the economy mode, torque is supplemented by the motor while the engine is being driven efficiently so as to maintain the vehicle performance for improvement of fuel efficiency. Unlike such a hybrid vehicle, in an engine type industrial vehicle having no traction motor, specifically in a forklift truck, simply operating the forklift truck in the Eco-mode so as to improve the fuel efficiency by restricting the torque may cause some troubles to some operations of the forklift trucks due to shortage of torque. For example, an industrial vehicle carrying a heavy load may not be able to climb a slope in a working site, which is supposed to be climbable, due to insufficient hill-climbing performance or insufficient engine torque.

The present invention is directed to providing an industrial vehicle capable of providing a torque restriction control in an Eco-mode that permits both improvement of fuel efficiency and maximization of vehicle performance.

SUMMARY OF THE INVENTION

The present invention is directed to providing an industrial vehicle which is equipped with an engine and having an Eco-mode in which torque of the engine is restricted. The industrial vehicle includes an accelerator, an accelerator opening detector that detects an opening of the accelerator, a vehicle speed detector that detects a speed of the vehicle, an engine speed detector that detects a speed of the engine, and a torque restriction releasing unit which, when the torque of the engine is restricted, if conditions that the opening of the accelerator detected by the accelerator opening detector is a first predetermined value or greater, that the vehicle speed detected by the vehicle speed detector is a second predetermined value or smaller and that the engine speed detected by the engine speed detector is a third predetermined value or smaller are satisfied, releases the torque restriction.

In accordance with an aspect of the present invention, when the torque is restricted, if the conditions that the opening of the accelerator detected by the accelerator opening detector is the first predetermined value or greater, that the vehicle speed detected by the vehicle speed detector is the second predetermined value or smaller and that the engine speed detected by the engine speed detector is the third predetermined value or smaller are satisfied, the torque restriction is released. Therefore, the torque restriction control is performed in such a way that improvement of fuel efficiency and maximization of vehicle performance are achieved simultaneously.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the embodiments together with the accompanying drawings in which:

FIG. 2A is a table explaining the conditions for releasing a torque restriction in the forklift truck of FIG. 1;

FIG. 2B is a table for explaining the conditions for resuming the torque restriction in the forklift truck of FIG. 1.

DETAILED DESCRIPTION OF THE EMBODIMENTS

The following will describe an embodiment of an industrial vehicle according to the present invention with reference to the drawings.

Figure 1:
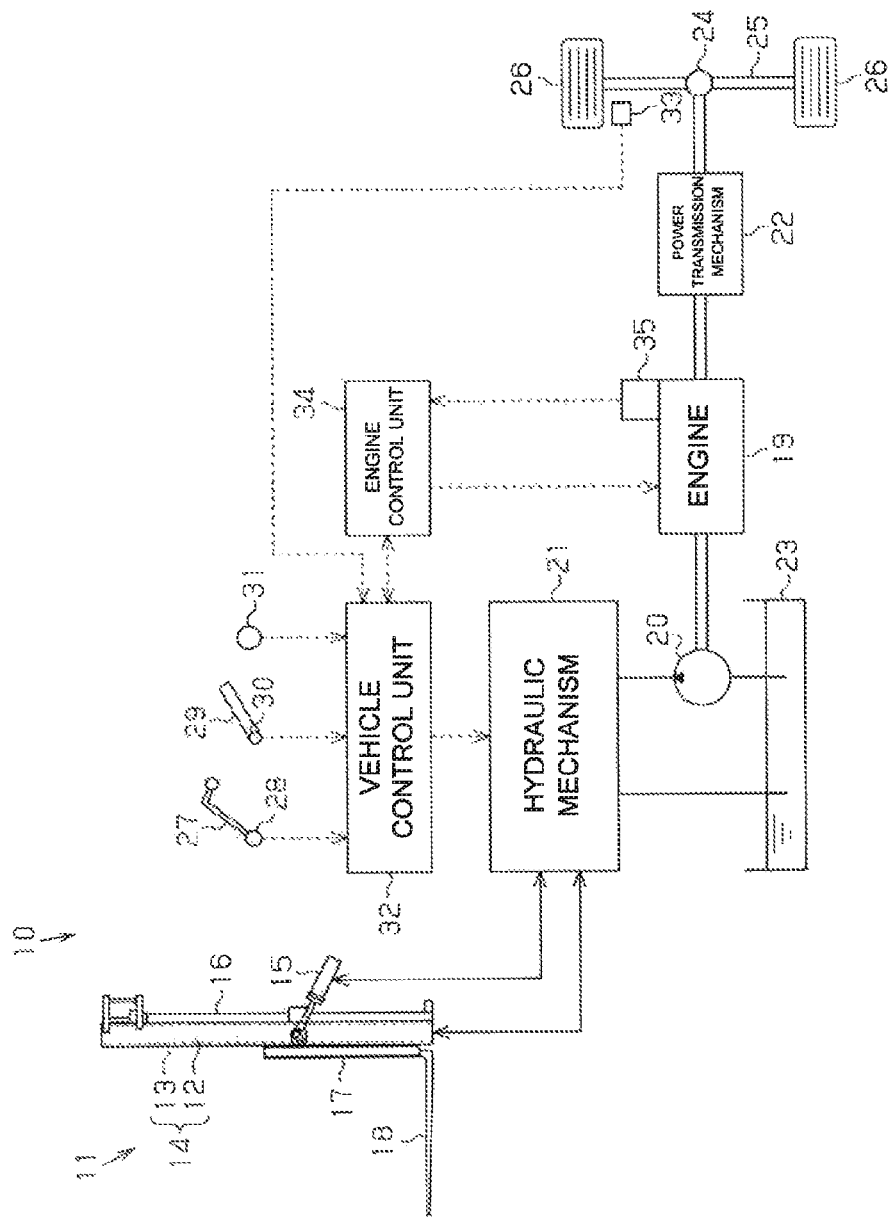
FIG. 1 is a schematic view showing an overall configuration of a forklift truck according to an embodiment of the present invention.

Referring to FIG. 1, numeral 10 designates a forklift truck including a loading unit 11. The loading unit 11 has a multi-stage mast assembly 14 including a pair of right and left outer masts 12 and a pair of inner masts 13. Each outer mast 12 is connected to a hydraulic tilt cylinder 15 and each inner mast 13 is connected to a hydraulic lift cylinder 16. The mast assembly 14 is tiltable in the forward and backward directions of the forklift truck 10 in response to hydraulic oil flowing into and out of the tilt cylinders 15. The inner masts 13 are movable upward and downward in the vertical direction of the forklift truck 10 in response to hydraulic oil flowing into and out of the lift cylinders 16. Forks 18 are mounted to the inner masts 13 via lift brackets 17. The inner masts 13 are raised and lowered along the outer masts 12 by the operation of the lift cylinders 16 and the forks 18 and the lift brackets 17 and moved accordingly.

The forklift truck 10 includes an engine 19 that serves as a drive source for traveling and loading operation of the forklift truck 10, a hydraulic pump 20 that is driven by the engine 19, a hydraulic mechanism 21 to which hydraulic oil discharged from the hydraulic pump 20 is supplied and a power transmission mechanism 22. Output of the engine 19 is converted into the drive force for traveling of the forklift truck 10 and also the drive force for operating the tilt cylinders 15 and the lift cylinders 16 for loading operations.

The hydraulic pump 20 is driven to pump hydraulic oil in an oil tank 23. The pumped oil is then supplied to the tilt cylinders 15 and the lift cylinders 16 through the hydraulic mechanism 21 and at the same time, the hydraulic oil discharged from the tilt cylinders 15 and the lift cylinders 16 is returned to the oil tank 23 through the hydraulic mechanism 21. The hydraulic mechanism 21 includes an electromagnetic control valve (not shown) that controls supply and discharge of the hydraulic oil flowing into and out of the tilt cylinders 15 and the lift cylinders 16.

The power transmission mechanism 22 has a mechanism for transmitting power such as a torque converter or a clutch (neither being shown). The engine 19 is connected to the power transmission mechanism 22, which is in turn connected to a pair of drive wheels 26 via a differential gear 24 and an axle 25 having the drive wheels 26 mounted on the opposite ends thereof. Therefore, the output power of the engine 19 is transmitted to the drive wheels 26 through the power transmission mechanism 22, the differential gear 24 and the axle 25.

Operation of the tilt cylinders 15 and the lift cylinders 16 is accomplished by operating a loading lever 27 which actually includes a tilt lever and a lift lever. Operation of the loading lever 27 is detected by a loading lever sensor 28. Acceleration of the forklift truck 10 is accomplished by depressing an accelerator pedal 29. The depression of the accelerator pedal 29 or the opening of the accelerator pedal 29 is detected by an accelerator opening sensor 30. An Eco-mode switch 31 is provided at a position adjacent to the driver's seat of the forklift truck 10.

The forklift truck 10 further includes a vehicle control unit 32. The vehicle control unit 32 is electrically connected to the loading lever sensor 28, the accelerator opening sensor 30, the Eco-mode switch 31 and a vehicle speed sensor 33 as the vehicle speed detector of the present invention. Based on the detection signals from the sensors 28, 30, 33 and the switch 31, the vehicle control unit 32 determines the operation of the loading lever 27, the depression of the accelerator pedal 29 (or the opening of the accelerator 29), the vehicle speed and the Eco-mode switch 31 (ON or OFF position). For a desired loading operation, the vehicle control unit 32 controls the hydraulic mechanism 21 thereby to control the flow of hydraulic oil into and out from the tilt cylinders 15 and the lift cylinders 16. Specifically, for example, the forklift truck driver operates the tilt cylinders 15 and the lift cylinders 16 by operating the loading lever 27 (the tilt lever or the lift lever) while depressing the accelerator pedal 29.

The vehicle control unit 32 is connected to an engine control unit 34 that controls the engine 19. The engine 19 has an engine speed sensor 35 that detects the speed of the engine 19. The engine speed sensor 35 as the engine speed detector of the present invention generates rotation detection signals to the engine control unit 34. The vehicle control unit 32 detects the speed of the engine 19 based on the signal from the engine control unit 34.

The vehicle control unit 32 generates to the engine control unit 34 an instruction signal to control the speed of the engine 19. Specifically, for example, the speed of the engine 19 is controlled according to the depression of the accelerator pedal 29. The vehicle control unit 32 also generates to the engine control unit 34 a torque restriction instruction signal according to the position of the Eco-mode switch 31. Upon receipt of the torque restriction instruction signal, the engine control unit 34 controls the engine 19 so as to restrict its output torque in the Eco-mode of operation.

The following will describe the operation of the forklift tuck 10.

The vehicle control unit 32 changes the value for the torque restriction according to the ON or OFF position of the Eco-mode switch 31 and a signal representing the torque restriction value is issued to the engine control unit 34. In normal mode of operation, the engine 19 generates a full torque corresponding to the current opening of the accelerator pedal 29. In the Eco-mode of operation, on the other hand, the output torque of the engine 19 is restricted and the engine 19 generates a torque that is reduced to approximately 80 percent of full torque in the normal mode, thereby suppressing the consumption of fuel by the engine 19. It is to be noted that an optimum value for the torque restriction is previously determined taking the maximum load capacity, the specifications of the engine 19 and the nature of the task to be taken by the forklift truck 10 into account.

The vehicle control unit 32 determines the opening of the accelerator pedal 29, the operated position of the loading lever 27, the vehicle speed and the speed of the engine 19.

As shown in FIG. 2A, the conditions A1, A2, A3 and A4 are previously set as the conditions for releasing the torque restriction.

In the table of FIG. 2A, the condition A1 is a condition associated with the opening of the accelerator pedal 29 in releasing the torque restriction. The condition A1 requires that the opening of the accelerator pedal 29 be a first predetermined value XA or greater. The value XA corresponds to the full opening of the accelerator pedal 29. In view of a free play of the accelerator pedal 29, the value XA may be 85% to 90% of the opening of the accelerator pedal 29 which is fully, or 100%, depressed.

The condition A2 in the table of FIG. 2 is a condition associated with the vehicle speed of the forklift truck 10 in releasing the torque restriction. The condition A2 requires that the vehicle speed be a second predetermined value YA or smaller. The value YA is a second predetermined value used for determining whether or not the vehicle is substantially at a stop. The reference value for the stop does not need to be 0 km/h representing a complete stop of the forklift truck 10, but is preferably set to approximately 1 to 3 km/h with the accuracy of the vehicle speed sensor 33 taken into account.

The condition A3 in the table of FIG. 2 is a condition associated with the speed of the engine 19 in releasing the torque restriction. The condition A3 requires that the speed of the engine 19 be a third predetermined value Z or smaller. The value Z represents a maximum engine speed or the number of rotations (NMR) of the engine 19 operating under no load. Actually, the value Z is a value which is obtained by subtracting a predetermined value (for example, 100 rpm) from the NMR with an error between the instruction value of engine speed in a diesel engine and the actual engine speed taken into account.

The condition A4 in the table of FIG. 2 is a condition associated with the operation of the forklift truck 10. The condition A4 requires that the forklift truck 10 be not in loading operation. Determination of this condition A4 may be accomplished by the detection of the operation of the loading lever 27.

Referring to FIG. 2B, the conditions B1 and B2 are previously set as the conditions for resuming the torque restriction after it has been once released (resuming conditions).

The condition B1 shown in FIG. 2 is a condition associated with the opening of the accelerator pedal 29 in resuming the torque restriction. The condition B1 requires that the opening of the accelerator pedal 29 be a fourth predetermined valued XB or smaller. The value XB corresponds to the opening of the accelerator pedal 29 other than the full opening of the accelerator pedal 29, e.g. the position where the accelerator pedal 29 is released from its fully depressed position. Therefore, the value XB in the condition B1 is smaller than the value XA in the condition A1. For the above released condition of the accelerator pedal 29 to be detected surely, the value XB is set to approximately 50% of the full opening of the accelerator pedal 29.

The condition B2 shown in FIG. 2 is a condition associated with the vehicle speed of the forklift truck 10 in resuming the torque restriction. The condition B2 requires the vehicle speed to once reach or exceed a fifth predetermined value YB and then decreases to or below the second predetermined value YA. The value YB is previously set to approximately 1 to 5 km/h as the reference value for determining whether or not the forklift truck 10 is traveling by the output power of the engine 19 transmitted through the power transmission mechanism 22. Furthermore, the value YA is a previously set value for determining based on the vehicle speed that operation of stopping the forklift truck 10 is made after the vehicle speed once reached or exceeded the fifth predetermined value YB. Since a forklift truck is generally operated continuously without being completely stopped between tasks, as described earlier, the value YA is not set to 0 km/h representing a complete stop of the forklift truck 10, but to approximately 1 to 3 km/h with the accuracy of the vehicle speed sensor 33 taken into account.

It is to be noted that the respective predetermined values for the opening of the accelerator pedal 29 and the vehicle speed are specified for the reasons described above and have been established previously through experiments conducted based on data such as the maximum load capacity of the forklift truck 10 and the characteristics of the engine 19 to be mounted on the forklift truck 10.

Figure 3:
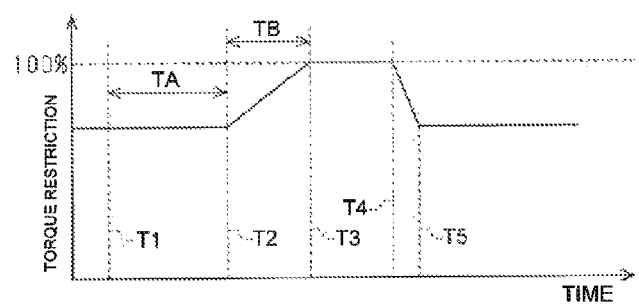
FIG. 3 is a timing chart showing the operation of the forklift truck of FIG. 1.

FIG. 3 is a timing chart explaining the sequence of torque restriction on the engine 19, transitioning firstly from a state in which the torque is restricted to be smaller than that in the normal mode of operation (such state hereinafter being referred to as the torque restriction state) to a state in which torque is no more restricted (such state hereinafter being referred to as the torque restriction released state), and then again to the torque restriction state.

In the timing chart of FIG. 3, the forklift truck 10 remains in the torque restriction state until time T1.

When the conditions A1 through A4 in FIG. 2A are satisfied at time T1 in FIG. 3 and this is continued for a predetermined period of time TA, the vehicle control unit 32 as the torque restriction releasing unit of the present invention starts reducing the torque restriction gradually at time T2 shown in FIG. 3. Specifically, TA between T1 and T2 is a predetermined period of time during which the torque restriction releasing conditions are satisfied.

The predetermined period of time TA is set for the purpose of preventing releasing of the torque restriction by transient satisfaction of the conditions A1 through A4. Specifically, the period of time TA is set to approximately 10 to 30 seconds as the value which allows the vehicle speed of the forklift truck 10 to reach its maximum in traveling on a flat surface. The value TA has been determined previously through experiments based on data such as the maximum load capacity of the forklift truck 10 or the characteristics of the engine 19 to be mounted to the forklift truck 10.

Transition from the torque restriction state to the torque restriction released state is performed gradually and the transition to the torque restriction released state is completed at time T3 in FIG. 3. Specifically, the period of time TB between T2 and T3 is the time during which transition is performed from the torque restriction state to the torque restriction released state.

Thus, the forklift truck 10 enters the torque restriction released state, so that the forklift truck 10 is supplied with an engine torque required for climbing a slope.

The following will describe the operation of the forklift truck 10 more in detail.

It is assumed that the Eco-mode switch 31 of the forklift truck 10 is tuned ON by an administrator to restrict the torque and lock the forklift truck 10 in the Eco-mode. Operator of the forklift truck 10 is not authorized to change mode but allowed only to operate the forklift truck 10 in the Eco-mode with the torque restriction.

In the case of a diesel engine, the fuel injection is reduced by the torque restriction and the output torque of the engine 19 is reduced, accordingly. In the case of a gasoline engine, the opening of the throttle valve and hence the flow of air passing through the throttle valve is reduced and the output torque of the engine 19 is reduced, accordingly. The output torque of the engine 19 is thus restricted according to the opening of the accelerator pedal 29 and the acceleration performance of the forklift truck 10 is restricted thereby to reduce the fuel consumption of the engine 19.

The vehicle speed or the loading speed may be controlled by adjusting the torque of the engine 19 (or the speed of the engine 19) through depression of the accelerator pedal 29. If the condition A1 (the opening of the accelerator pedal 29 being XA or greater), the condition A2 (the vehicle speed being the second predetermined value YA or smaller) and the condition A3 (the engine speed being the third predetermined value Z or smaller) are kept satisfied for a predetermined duration of time, it is determined that the forklift truck 10 is unable to climb the slope.

If the condition A1 that the opening of the accelerator pedal 29 is XA or greater, the condition A2 that the vehicle speed is YA or smaller, and the condition A3 that the speed of the engine 19 is Z or smaller, are satisfied for the predetermined period of time, it is determined that the forklift truck 10 is traveling with the accelerator pedal 29 fully depressed, and if such state is continued for the predetermined period of time TA, the torque restriction is reduced gradually. For example, the forklift truck 10 loaded with a heavy load in the Eco-mode may not be able to climb a slope due to insufficient torque. In such a case, however, the forklift truck 10 can climb the slope by releasing the torque restriction.

The condition A3 is used for determining that the engine 19 is operating under a load. Therefore, if the speed of the engine 19 is the third predetermined value Z or smaller (a value obtained by subtracting a predetermined value from the NMR), it is determined that engine racing is not performed. Engine racing refers to running an engine at a high speed under no load with the accelerator fully depressed and the clutch disengaged. The racing is performed during an inspection or for warming-up of a vehicle. The torque is restricted when performing the racing. That is, the racing should preferably be performed in the torque restriction state.

In other words, when it is determined that the engine speed is less than the predetermined value Z (NMR of the engine 19 operating under no load), unexpected releasing of the torque restriction on the engine 19 which is then being raced with the forklift truck 10 placed at a stop on a flat surface.

When it is determined that the forklift truck 10 is not in the loading operation as in the case that the condition A4 is satisfied, it can be ascertained that the forklift truck 10 is operating under a traveling load. In other words, the torque restriction is not released in the case that the forklift truck 10 is operating under a load associated with the loading operation.

In the period between T2 and T3 in FIG. 3, that is the period during which the torque restriction state is shifted to the torque restriction released state, if the opening of the accelerator pedal 29 becomes zero (accelerator OFF), the forklift truck 10 is returned to the torque restriction sate.

The following will describe the operation for resuming the torque restriction.

It is assumed that the forklift truck 10 is in the torque restriction released state in the period of time after time T3 and before time T4 in the diagram of FIG. 3.

If one of the conditions B1 and B2 shown in FIG. 2B, which are the conditions for resuming torque restriction, is satisfied at time T4 in the diagram of FIG. 3, the vehicle control unit 32, which serves as the torque restriction resuming unit of the present invention, operates so as to restrict the torque again in a gradual manner for resumption of the torque restriction. The resumption of the torque restriction is performed gradually over a period of time from time T4 to time T5 at which the resumption is completed. Thus, the forklift truck 10 is returned to the torque restriction state.

By so controlling, the forklift truck 10 returns from the torque restriction released state to the torque restriction state that enables improvement of fuel efficiency.

The following will describe the operation for resuming the torque restriction more in detail.

In the condition B1, when the accelerator pedal 29 fully depressed in the condition A1 is released, the output torque of the engine 19 drops, which means that the torque restriction does not need to be released. Thus, the forklift truck 10 returns to the torque restriction state. Specifically, if the condition B1 is satisfied, that is, when the opening of the accelerator pedal 29 is reduced to XB or less, it is determined that the torque restriction needs to be resumed.

In the condition B2, an operation being attempted to stop the forklift truck 10 after the vehicle speed once reached or exceeded the predetermined value YB constitutes a timing for resuming the torque restriction. Specifically, when the vehicle speed once reaches or exceeds the fifth predetermined value YB and then decreases to or below the predetermined value YA, it is determined that the torque restriction needs to be resumed. Accordingly, the torque restriction is enabled again when the forklift truck 10 is accelerated again.

The above-described embodiment of the industrial vehicle offers the following effects:

(1) When the mode of operation of the forklift truck 10 is locked to the Eco-mode and the operator cannot cancel the mode, the forklift truck 10 appropriately releases the torque restriction and also resumes the torque restriction for the purpose of improving the fuel efficiency. Additionally, the detection of the traveling condition and the state of loading operation of the forklift truck 10 makes possible controlling of the torque restriction appropriately in view of the manner of operation that is specific to a forklift truck. Alternatively, the forklift truck 10 may be equipped with an angle gauge that measures a slope. In the present embodiment, however, the torque restriction can be controlled without such an additional device. Therefore, the improvement of the fuel efficiency of the engine type forklift truck 10 can be accomplished with no increase in manufacturing cost. Furthermore, the minimum required hill-climbing performance of the forklift truck 10 is ensured without an angle gauge for detecting a slope.

(2) The engine type forklift truck 10 has the accelerator opening sensor 30, the vehicle speed sensor 33, the engine speed sensor 35 and the vehicle control unit 32. When the condition that the opening of the accelerator pedal 29 is the first predetermined value XA or greater and the condition that the vehicle speed is the second predetermined value YA or smaller and the condition that the engine speed is the third predetermined value Z or smaller are satisfied while the forklift truck 10 is in the torque restriction state, the vehicle control unit 32 releases the torque restriction. By so controlling, if the above conditions are satisfied while the forklift truck 10 is in the torque restriction state, the torque restriction is released and the engine 19 generates a torque that is required for performing any specific operation. Releasing the torque restriction according to the vehicle conditions in the Eco-mode operation of the forklift truck 10 makes possible fulfillment of the improved fuel efficiency and the maximum vehicle performance.

(3) After the torque restriction is released, if one of the condition that the opening of the accelerator pedal 29 is the fourth predetermined value XB or smaller and the condition that the vehicle speed once reaches or exceeds the fifth predetermined value YB and then decreases to or below the second predetermined value YA is satisfied (if one of the conditions B1 and B2 in FIG. 2B is satisfied), the torque restriction is resumed. Such torque restriction controlling makes the torque restriction to be resumed easily from the torque restriction released state. In other words, the torque restriction becomes effective again according to the state of the forklift truck 10. Therefore, the fuel efficiency can be improved by using the Eco-mode operation of the forklift truck 10.

(4) The resumption of the torque restriction, which is accomplished by fulfillment of the condition B1, that is the opening of the accelerator pedal 29 being the fourth predetermined value XB or smaller, can be made rapidly.

(5) The torque restriction once released when the vehicle speed in (3) above becomes YA or smaller can be resumed if the vehicle speed becomes YB or greater. The resumption of the torque restriction, which is accomplished by fulfillment of the condition B2, that is the condition that the vehicle speed once reaches or exceeds the fifth predetermined value YB and then accelerating the forklift truck 10.

(6) By providing the condition A4 as the condition for releasing the torque restriction that the forklift truck 10 is not in loading operation, the torque restriction is not released unexpectedly when the forklift truck 10 in the torque restriction state is in loading operation, such as raising a heavy load.

(7) In the torque restriction releasing condition A3, the speed of the engine 19 which is the third predetermined value Z or smaller is equal to or smaller than a maximum speed of the engine 19 that is operating under no load. Therefore, the torque restriction is not released when the engine 19 is operating at a high speed under no load, but is released only when the engine 19 is subjected to a load, which helps to improve the fuel efficiency.

(8) The torque restriction is reduced gradually in releasing of the torque so that the forklift truck operator will not suffer from an uncomfortable feel.

The present invention is not limited to the above embodiment, but it may be embodied in various ways as exemplified in the following.

When the torque is restricted, the engine output of the forklift truck 10 may be insufficient for pushing or pulling a heavy load (pushing operation of the lift), as well as in the case of climbing a slope. In such case, the torque restriction may be released or resumed according to the vehicle conditions that are similar to the torque restriction releasing conditions or the torque restriction resuming conditions, respectively, in the above-described embodiment.

The torque restriction control in the above-described embodiment may be applied to industrial vehicles other than forklift trucks, which are equipped with implements such as a bucket. Furthermore, in the case that the torque restriction control is applied to an industrial vehicle such as a traction vehicle having no loading unit, the condition A4 that requires the industrial vehicle not to be in loading operation may be omitted.

The control value of the hydraulic mechanism 21 is of an electromagnetic type and its operation is controlled based on electrical signals from the vehicle control unit 32. However, such electromagnetic control valve may be replaced by a mechanical valve. Specifically, various operation parts may be connected to the control valve so that the open and closed state is switched by operating such operation parts.

The power transmission mechanism 22 may use either a torque converter or a manual transmission.

What is claimed is:

1. An industrial vehicle which is equipped with an engine and has an Eco-mode in which torque of the engine is restricted, comprising:
    an accelerator;
    an accelerator opening detector that detects an opening of the accelerator;
    a vehicle speed detector that detects a speed of the vehicle;
    an engine speed detector that detects a speed of the engine; and
    a torque restriction releasing unit which, when the Eco-mode is ON, turns OFF the Eco-mode to release the restriction of the torque of the engine temporarily, based upon all of the following conditions being satisfied; (i) the opening of the accelerator detected by the accelerator opening detector is a first predetermined value or greater; (ii) the vehicle speed detected by the vehicle speed detector is a second predetermined value or smaller; and (iii) the engine speed detected by the engine speed detector is a third predetermined value or smaller.

2. The industrial vehicle according to claim 1, further comprising a torque restriction resuming unit which, after the Eco-mode is turned OFF by the torque restriction releasing unit, turns ON the Eco-mode, based upon one of the following conditions being satisfied; (i) the opening of the accelerator detected by the accelerator opening detector is a fourth predetermined value or smaller; and (ii) the vehicle speed detected by the vehicle speed detector once reaches or exceeds a fifth predetermined value and then decreases to or below the second predetermined value.

3. The industrial vehicle according to claim 1, wherein the torque restriction releasing unit further requires, as the conditions for turning OFF the Eco-mode, that (iv) the industrial vehicle is not in a loading operation.

4. The industrial vehicle according to claim 1, wherein the engine speed is set to the third predetermined value or smaller, the third predetermined value being determined based on a maximum speed of the engine operating under no load.

5. The industrial vehicle according to claim 1, wherein the torque restriction releasing unit gradually reduces the torque restriction when the Eco-mode is turned OFF.

* * * * *